UNITED STATES PATENT OFFICE

CHARLES FREDERICK CHRIS HERTING, OF BERKELEY, CALIFORNIA.

PROCESS FOR REFINING CRUDE CARBON.

1,416,955.     Specification of Letters Patent.     Patented May 23, 1922.

No Drawing.     Application filed October 4, 1921. Serial No. 505,277.

*To all whom it may concern:*

Be it known that I, CHARLES FREDERICK CHRIS HERTING, a citizen of the United States, and resident of Berkeley, county of Alameda, and State of California, have invented a new and useful Process for Refining Crude Carbon, of which the following is a specification.

The present invention relates to improvements in processes for the manufacture of a colloidal form of black carbon from waste carbon or lamp black, such as accumulates in gas houses where gas is made from fuel oil or crude petroleum and water in the form of steam (oil-water gas), or such carbon as accumulates in the oil refineries in the cracking or refining of crude petroleum.

This colloidal carbon is of fine velvety black color and is in such a minute state of sub-division that a little of it if rubbed down with water will stay suspended in the water for days at a time. Highly magnified the ultimate particles appear as minute perfect spheres showing the Brownian movement. As will later be seen, in the making of this pigment recourse is had mainly to subsidence and the use of a coagulant when the suspensoid phase of the carbon manifests itself. Filtration cannot be used for if it be attempted only a small portion would run through the filter and then the latter would be blocked.

The finished product is absolutely free of any tarry or asphaltic or similar material and commends itself generally in the arts where a very black pigment is required.

In the following description I am going to give a number of formulas incorporating the various figures and quantities which I have found to give practical results, without wishing to be confined to the particular quantities stated therein.

To begin with I boil 1000 parts by weight of the crude and impure carbon in a weak alkaline solution consisting preferably of 2000 parts of water, 5 parts of rosin-free soap and 10 parts of caustic soda. I then drain the solution, wash the remaining carbon once again with hot water and then dry the same. This boiling operation causes the lumpy carbon to break down into a granular mud, and at the same time the alkaline liquid removes much foul matter and affects the final shade of the carbon.

This partly purified carbon, which is thoroughly dried, I heat with commercial sulphuric acid, preferably in the proportion of 40 pounds of carbon to 70 pounds of sulphuric acid until sulphurous fumes are given out. I continue to heat the mixture for about 20 more minutes at a temperature of 150 to 200 degrees C. stirring the same constantly. To determine the length of the period for which it is to be heated I rely more on the appearance of the hot mass, however, than on the clock. The mass, which first is a rather thin and granular paste gradually loses its granular appearance as the operation progresses and finally becomes a thick, very smooth and unctuous paste.

This paste is run slowly into water which is kept stirred all the time and boiled for at least 15 minutes. The quantity of water used should be about 15 gallons.

The next step is the addition of a saline solution comprising preferably a mixture of 15 gallons of water with 63 pounds of rock salt. The treatment of the mass with sodium chloride frees the same of the sulphuric acid, the following equation holding—

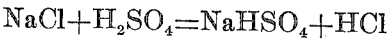

$$NaCl + H_2SO_4 = NaHSO_4 + HCl$$

and it also affects the final color of the carbon. After standing 15 and 30 minutes respectively two sediments are obtained, or the black liquid may be strained through two different fine screens. Both end products in the above equation may be considered recovery by-products.

It takes from three to eight hours for the fine carbon in the liquid to settle, depending upon the quantity of water it is diluted with. After the acid and saline solutions are poured off the sediment the latter is washed in water and it takes a still longer period for the carbon to settle again in this new medium, depending upon the quantity of washing water added. From five to seven washings are necessary to obtain the finished product and each washing takes a longer period of time than the preceding one. During the third or fourth washing the carbon manifests itself as a colloidal suspensoid and it becomes extremely difficult for the same to subside or settle. At the fifth or sixth washing it may take several weeks, depending again upon the amount of wash water the sediment is diluted with. It is necessary to use from five to seven washings in order to render the amount of saline matter in the final carbon a negligible quantity.

To facilitate this washing I have recourse to another operation which constitutes a final step in my process, and which consists in the addition of from 1% to 2% of saturated solution of aluminum chloride which reduces the time of settlement to a few hours.

The slimy, unctuous and very black mud is dried below 95 degrees C., powdered, and may be separated into different degrees of fineness by air flotation.

The small trace of $Al_2Cl_6$ in the final product hydrolyzes to $Al_2O_3$ in the drying process and the carbon on rubbing down with a little water goes into the colloidal state again requiring a long time to settle.

I claim:

1. In the process of refining crude lamp black the method of purifying the same which consists in treating the crude lamp black with an alkaline liquid in a heated condition.

2. The process of refining crude lamp black which consists in the heating of substantially three parts of partly purified lamp black with substantially five parts of a sulphuric acid until it changes from a thin granular paste into a thick, unctuous paste.

3. The process of refining crude lamp black which consists in slowly pouring the thick paste gained by heating substantially three parts of partly purified lamp black with substantially five parts of a sulphuric acid into water and stirring the same.

4. The process of refining crude lamp black which consists in heating the product gained by heating partly purified lamp black with a sulphuric acid in a saline solution.

5. The process of refining crude lamp black which consists in facilitating the settling of carbon in an acid saline solution by adding a saturated solution of aluminum chloride.

6. The process of refining crude lamp black which consists in boiling the same in an alkaline liquid, heating the product with a sulphuric acid until it changes to a thick paste and adding the paste to a saline solution.

7. The process of refining crude lamp black which consists in boiling the same in an alkaline liquid, heating the product with a sulphuric acid until it changes into a thick paste, pouring the latter slowly into boiling water and thereafter adding it to a saline solution.

CHARLES FREDERICK CHRIS HERTING.